(12) United States Patent
Kutch

(10) Patent No.: US 10,057,330 B2
(45) Date of Patent: Aug. 21, 2018

(54) APPARATUS AND METHOD FOR DEFERRING ASYNCHRONOUS EVENTS NOTIFICATIONS

(71) Applicant: Intel Corporation, Santa Clara, CA (US)

(72) Inventor: Patrick G. Kutch, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 596 days.

(21) Appl. No.: 14/532,872

(22) Filed: Nov. 4, 2014

(65) Prior Publication Data

US 2016/0127171 A1 May 5, 2016

(51) Int. Cl.
*H04L 29/08* (2006.01)
*H04L 12/24* (2006.01)

(52) U.S. Cl.
CPC ............ *H04L 67/10* (2013.01); *H04L 41/069* (2013.01); *H04L 41/0631* (2013.01)

(58) Field of Classification Search
CPC .... H04L 67/10; H04L 41/069; H04L 41/0631
See application file for complete search history.

(56) References Cited

U.S. PATENT DOCUMENTS

| | | | | |
|---|---|---|---|---|
| 7,519,167 B2 * | 4/2009 | Jreij | ......................... | H04L 45/00 379/90.01 |
| 7,757,033 B1 * | 7/2010 | Mehrotra | .............. | H04L 49/357 709/238 |
| 8,149,866 B2 * | 4/2012 | Jreij | ..................... | H04L 63/0209 370/389 |
| 2006/0184536 A1 * | 8/2006 | Jreij | ......................... | H04L 45/00 |
| 2008/0049621 A1 * | 2/2008 | McGuire | ............. | H04L 12/6418 370/236.2 |
| 2009/0210601 A1 * | 8/2009 | Greenstein | .............. | H04L 69/32 710/305 |
| 2011/0035474 A1 * | 2/2011 | Elzur | .................. | H04L 41/0816 709/221 |
| 2011/0078299 A1 * | 3/2011 | Nagapudi | ............... | H04L 12/12 709/223 |
| 2012/0124242 A1 * | 5/2012 | Chen | ................... | H04L 43/0817 709/250 |
| 2013/0326039 A1 * | 12/2013 | Shah | ....................... | H04L 41/04 709/223 |
| 2015/0077911 A1 * | 3/2015 | Hsu | .................... | H01R 13/7175 361/679.02 |
| 2015/0082063 A1 * | 3/2015 | Peterson | ................. | G06F 13/40 713/323 |
| 2015/0106660 A1 * | 4/2015 | Chumbalkar | ....... | G06F 11/0727 714/42 |

(Continued)

*Primary Examiner* — Uzma Alam
(74) *Attorney, Agent, or Firm* — Schwabe, Williamson & Wyatt, P.C.

(57) ABSTRACT

Embodiments of apparatuses and methods for self-service payment based on location and time information are described. In embodiments, a device may include a data module to store one or more Asynchronous Events Notifications (AENs) or Ethernet frames. The device may further include a Network Interface Controller (NIC), coupled to the data module, to send the one or more AENs or Ethernet frames to a Baseboard Management Controller (BMC) in response to receipt of a command from the BMC indicating an opportunity for the NIC to send AENs or Ethernet frames to the BMC. Other embodiments may be described and/or claimed.

24 Claims, 6 Drawing Sheets

(56) References Cited

U.S. PATENT DOCUMENTS

| | | | |
|---|---|---|---|
| 2016/0085451 A1* | 3/2016 | Lee-Baron | G06F 3/0619 711/113 |
| 2016/0119180 A1* | 4/2016 | Tsai | G06F 11/0745 370/241 |
| 2016/0132449 A1* | 5/2016 | Aldebert | G06F 13/3625 710/117 |

* cited by examiner

APPARATUS AND METHOD FOR DEFERRING ASYNCHRONOUS EVENTS NOTIFICATIONS

FIELD OF THE INVENTION

The present disclosure relates generally to the technical field of computing, and more particularly, to apparatuses and methods for deferring Network Controller Sideband Interface (NC-SI) Asynchronous Events Notifications (AENs).

BACKGROUND

The background description provided herein is for generally presenting the context of the disclosure. Unless otherwise indicated herein, the materials described in this section are not prior art to the claims in this application and are not admitted to be prior art or suggestions of the prior art by inclusion in this section.

The Network Controller Sideband Interface (NC-SI) specification was initially published in 2007. This NC-SI specification includes both the physical (electrical) and protocol aspects of NC-SI, which enable the connection of a Baseboard Management Controller (BMC), also referred to as a Management Controller (MC), to a set of Network Interface Controllers (NICs), e.g., for out-of-band remote manageability. The NC-SI specification allows a single BMC to be connected to multiple network controllers. In some cases, an NC-SI may include a point-to-point interface between a BMC and an Ethernet Controller (EC).

NC-SI traffic may include pass-through traffic and control traffic as Ethernet frames. Control traffic may include three different types of packets, Commands, Responses and Alerts. Configuration commands allow the BMC to gather information from an NIC (e.g., current link status). The BMC may also use commands to configure the NIC to send and receive Ethernet frames to and from the BMC. Responses include the response of an NIC to the command from the BMC. Alerts are called Asynchronous Events Notifications (AENs). They are alerts that can be sent asynchronously by the NIC to the BMC to indicate things such as a link status change or a change in operating system driver state. AENs provide a mechanism that allows the BMC to be informed of important changes without having to poll a network controller.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
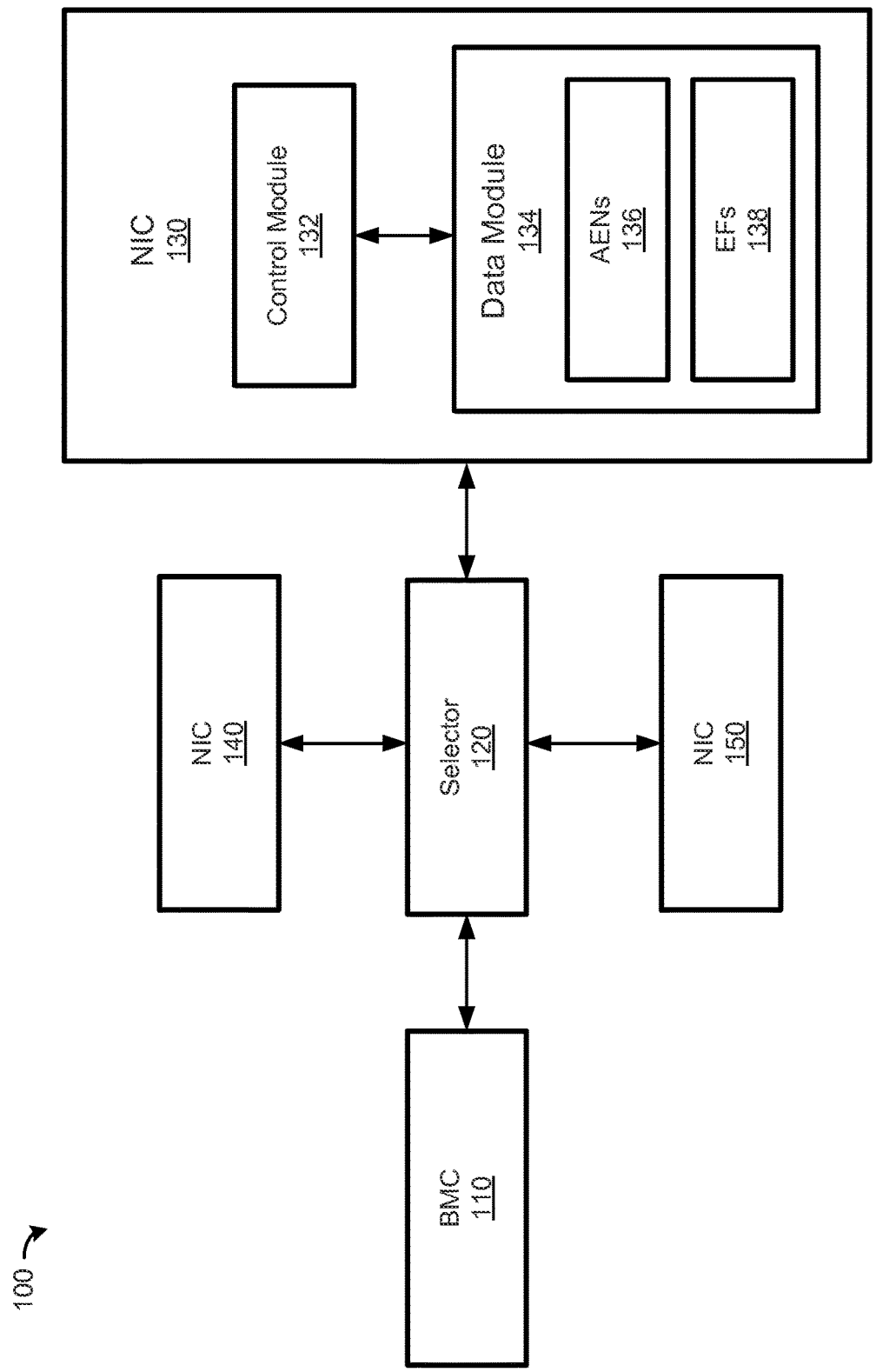
FIG. 1 is a schematic diagram illustrating an example system configuration for facilitating deferred AENs in a shared topology, incorporating aspects of the present disclosure, in accordance with various embodiments.

Embodiments of apparatuses and methods for facilitating deferred NC-SI notifications in a shared topology are described. In embodiments, an apparatus may include a data module to store one or more Asynchronous Events Notifications (AENs) or Ethernet frames (EFs). The apparatus may further include a Network Interface Controller (NIC), coupled to the data module, to send the one or more AENs or EFs to a Baseboard Management Controller (BMC) in response to receipt of a command from the BMC indicating an opportunity for the NIC to send AENs or Ethernet frames to the BMC. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in another embodiment," "in some embodiments," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software.

Referring now to FIG. 1, an example system configuration for facilitating deferred AENs in a shared topology, in accordance with various embodiments, is illustrated. System 100 may include BMC 110 coupled to a selector 120, which enables the BMC 110 to communicate with at least one of NIC 130, 140, or 150, in a shared topology. In various embodiments, NIC 130 may include data module 134, which holds data such as AENs 136 or Ethernet frames (EFs) 138. NIC 130 may also include control module 132. Control module 132 may send the one or more AENs or EFs in AENs 136 or EFs 138 to BMC 110 in response to receipt of a command from BMC 110 indicating an opportunity for NIC 130 to send AENs or Ethernet frames to BMC 110 in the shared topology.

In various embodiments, BMC 110 may communicate with any one of NIC 130, NIC 140, or NIC 150 based on the NC-SI. In some embodiments, the physical interface specification may be separated from the NC-SI protocol. As an example, NC-SI traffic may be sent over the Management Component Transport Protocol (MCTP), which provides a mechanism by which a message of any type can be sent over different physical mediums. The NC-SI and MCTP specification are independent from each other. MCTP may only reserve message types for NC-SI message payloads regardless of the nature of the payload. Thus, NC-SI commands, responses, and AENs may be encapsulated in MCTP messages. Similarly, NC-SI pass-through Ethernet traffic may also be encapsulated in MCTP messages. As a result, for example, the NC-SI command to read the link status of a NIC can be sent over the traditional NC-SI physical interface, or over any of the supported MCTP physical interfaces such as Peripheral Component Interconnect Express (PCIe) Vendor Defined Messages (VDMs) or System Management Bus (SMBus or SMB).

In various embodiments, BMC 110 may communicate with any one of NIC 130, NIC 140, or NIC 150 based on NC-SI over MCTP and further over SMBus. If a NIC that supports NC-SI over MCTP over SMBus is placed in a PCIe slot to which the BMC has an SMBus connection, the BMC may gain access to all the capabilities of NC-SI on that NIC, e.g., for asset management and configuration.

SMBus has a requirement that all devices (endpoints) on a shared bus must have a unique 8-bit address. In an environment where there can be multiple dynamic devices, which may be added and removed, the SMBus protocol has a mechanism by which an SMBus address may be dynamically assigned by a master, using the SMBus Address Resolution Protocol (ARP). However, in common practice, SMBus ARP is rarely used, especially in the server world. Instead, SMBus addresses may be hard-coded.

In some embodiments, all devices may be required to have the same hard-coded SMBus slave address. Further, each SMBus connection may be placed to PCIe add-in slots on an SMBus multiplexer (Mux). As an example, NIC 130, NIC 140, and NIC 150 may have the same hard-coded SMBus slave address. BMC 110 may then communicate with each NIC using the NC-SI over MCTP over SMBus connection, e.g., based on selector 120 to select a respective NIC in a round-robin fashion. In this example, selector 120 may be an SMBus Mux. In other embodiments, selector 120 may be associated with an Inter-Integrated Circuit ($I^2C$) bus, a serial link, a Peripheral Component Interconnect Express (PCIe) bus, or a Universal Serial Bus (USB). NIC 130 may be coupled to the bus in a shared topology of NIC 130, NIC 140, NIC 150, and other NICs.

The NC-SI protocol was originally designed for the NC-SI physical interface, which is presumed to be always available. However, in a shared medium topology, as depicted in FIG. 1, if no inherit medium dependent mechanism is provided for shared access for these NICs, the shared physical medium may not always be available for a particular NIC to send traffic to BMC 110, which is the case associated with the implementation of NC-SI over MCTP over SMBus.

When BMC 110 communicates with NIC 130 in a command/response pattern, BMC 110 may direct selector 120 to select NIC 130 as the communication destination. However, if NIC 130 generates AENs (e.g., due to link state change) for BMC 110, or if Ethernet frames have been received externally by NIC 130 that are destined for the BMC (hereinafter "EFs"), NIC 130 may not be able to send either of these kinds of traffic to BMC 110 unless selector 120 is active (e.g., MUXed) to this specific NIC 130. In various embodiments, instead of simply dropping the aforementioned traffic, NIC 130 may queue up these kinds of AENs or EFs in data module 134 (e.g., in AENs 136 and EFs 138 respectively) until such time as BMC 110 indicates to NIC 130 an opportunity to send AENs or EFs.

On the other side, in various embodiments, BMC 110 may request NIC 130 to store AENs and EFs until BMC 110 sends an explicit NC-SI command to NIC 130 to send these potentially stored AENs and EFs. In this regard, NIC 130 may be exposed to a number of new commands, such as, but not limited to, Begin Holding (this and other names of commands are exemplary names, and these new commands may be given any other names in various embodiments), which requests NIC 130 to start buffering AENs and/or EFs. In some embodiments, the Begin Holding command may be bifurcated and specific to either AEN or EF, e.g., when BMC 110 is only interested in one type of traffic but not the other. BMC 110 may also send an End Holding command to NIC 130, which requests NIC 130 to send any potentially buffered AENs or EFs to BMC 110. In various embodiments, BMC 110 may also send a Get Holding Info command to NIC 130, which requests NIC 130 to provide information about AENs and/or EFs held and potentially dropped (e.g., due to internal buffer overflow).

Resultantly, BMC 110 may still be able to utilize selector 120 to selectively receive previously held AENs and/or EFs from any one of NIC 130, NIC 140, or NIC 150 in a shared medium topology.

Figure 2:
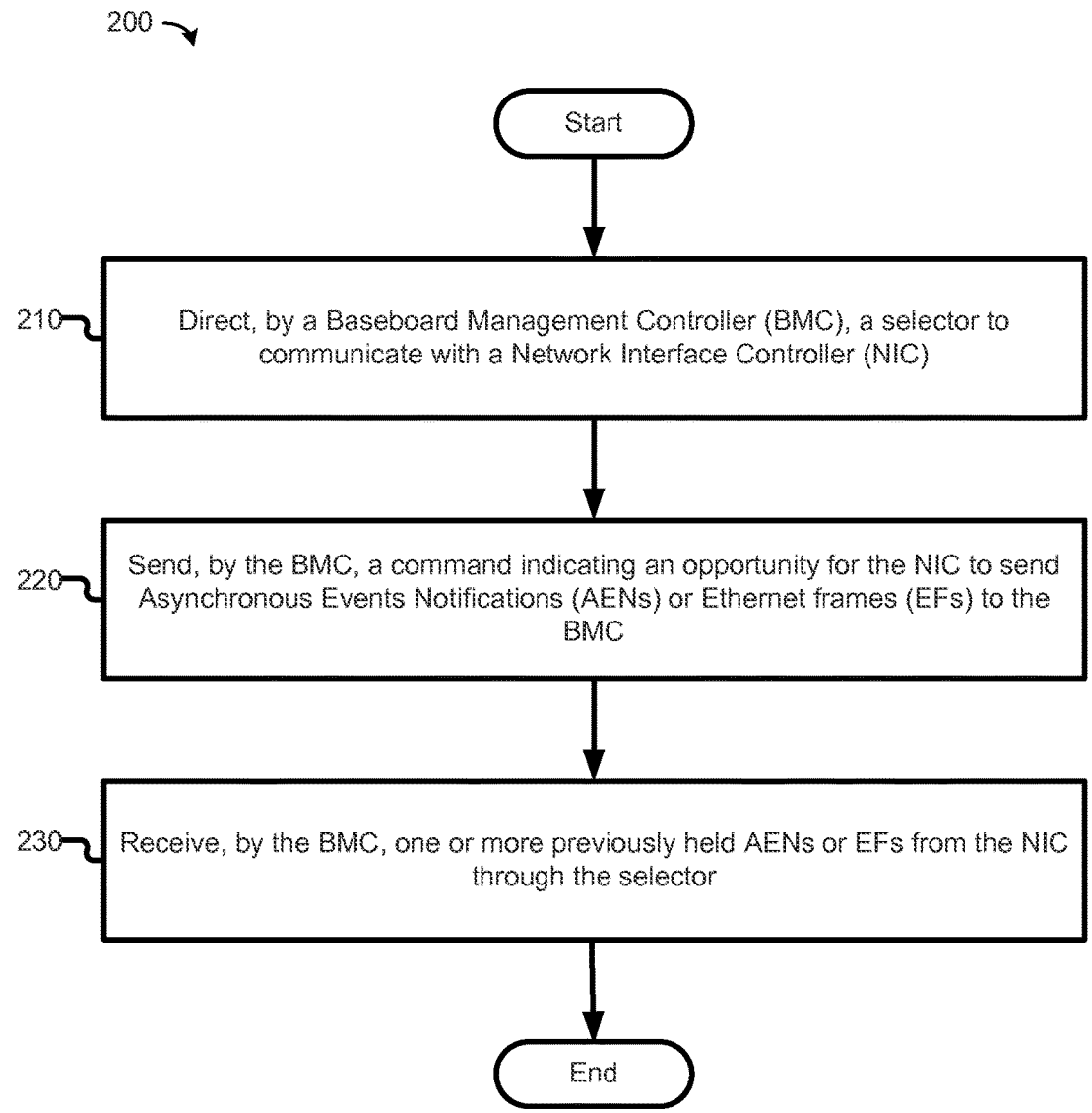
FIG. 2 is a flow diagram of an example process for facilitating deferred AENs in a shared topology, which may be practiced by an example BMC, incorporating aspects of the present disclosure, in accordance with various embodiments.

Referring now to FIG. 2, it is a flow diagram of an example process for facilitating deferred AENs with shared topology, which may be practiced by an example BMC in accordance with various embodiments. The process 200 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured to facilitate deferred NC-SI notifications with a shared topology. As such, process 200 may be performed by, e.g., BMC 110, to implement one or more embodiments of the present disclosure. In embodiments, process 200 may be performed with more or less operations or with the operations in different order.

In embodiments, the process may begin at block 210, where a selector may be directed to communicate with an NIC, e.g., by BMC 110 of FIG. 1. In some embodiments, multiple NICs may communicate with one BMC in a shared medium topology, e.g., as depicted in FIG. 1. For a shared medium, all endpoints may gain contention-based access to the medium. As an example, Ethernet uses the Carrier Sense Multiple Access/Collision Detection (CSMA/CD) protocol to avoid the collision problem. For a shared medium, all endpoints may gain controlled access to the medium. As an example, the token-based topology may provide access to the physical medium based on a token. An endpoint may grab the token off the medium, thus gain the privilege to access the shared medium while the token is still valid. However, in a shared medium topology, as depicted in FIG. 1, if no inherit medium dependent mechanism is provided for shared access for these NICs, the shared physical medium may not always be available for a particular NIC to send traffic to BMC 110. As an example, with the implementation of NC-SI over MCTP over SMBus, the BMC may have to direct a selector (e.g., an SMBus multiplexer) to enable communication to or from a particular NIC.

Next, at block 220, a command indicating an opportunity for the NIC to send AENs or EFs to the BMC may be sent, e.g., by BMC 110 to NIC 130 of FIG. 1. In some embodiments, a specific command, e.g., an End Holding command or any similar command with the similar purpose, may be sent from the BMC to a NIC, so that the NIC may send previously held AENs or EFs, if any, back to the BMC. In some embodiments, without any specific command from the BMC, the mere fact that a NIC is being selected by the selector may serve as the indication that the NIC may send previously held AENs or EFs to the BMC. In some embodiments, the Get Holding Info command to a NIC may also serve as the indication that the NIC may send previously held AENs or EFs to the BMC. As an example, some or all previously held AENs or EFs may piggyback onto the response to the Get Holding Info command.

Next, at block 230, one or more previously held AENs or EFs from the NIC may be received, e.g., by BMC 110 through a selector, e.g., selector 120 of FIG. 1. In some embodiments, a NIC may get sufficient time to send off all AENs or EFs in the buffer. Thus, the BMC may receive all previously held AENs or EFs from the NIC. In some embodiments, a NIC may only have limited time to send off whatever AENs or EFs may fit into the limited time. Thus, the BMC may receive a part of previously held AENs or EFs from the NIC. In this case, an indication that there are remaining AENs or EFs in the NIC may also be received from the NIC. In turn, the BMC may resume block 210 to allocate another opportunity for the NIC to send off buffered AENs or EFs.

Figure 3:
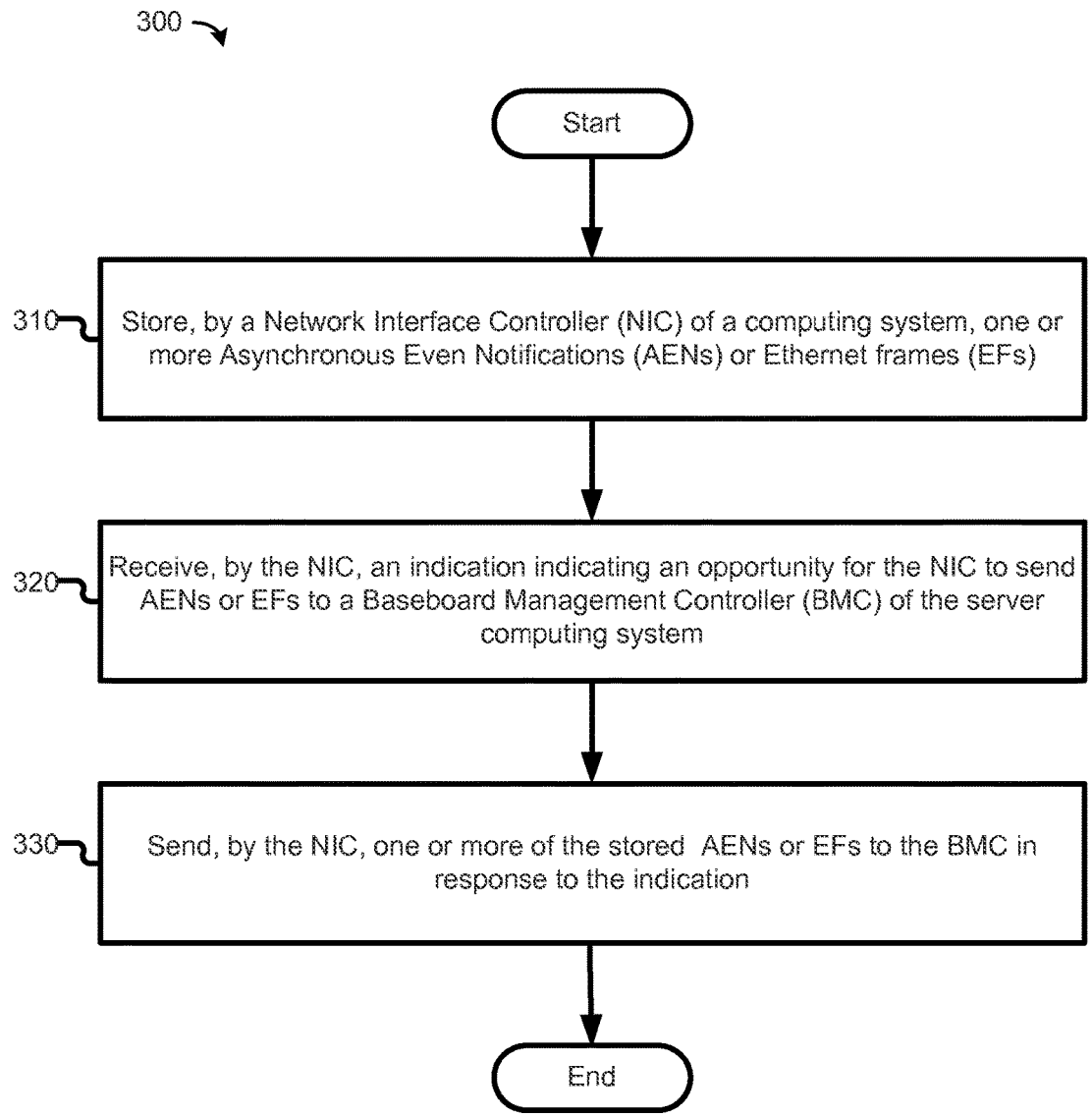
FIG. 3 is a flow diagram of an example process for facilitating deferred AENs in a shared topology, which may be practiced by an example NIC, incorporating aspects of the present disclosure, in accordance with various embodiments.

Referring now to FIG. 3, it is another flow diagram of an example process for facilitating deferred AENs with shared topology, which may be practiced by an example NIC in accordance with various embodiments. The process 300 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured to facilitate deferred NC-SI notifications with a shared topology. As such, process 300 may be performed by, e.g., NIC 130, to implement one or more embodiments of the present disclosure. In embodiments, process 300 may be performed with more or less operations or with the operations in different order.

In embodiments, the process may begin at block 310, where one or more AENs or EFs may be stored by an NIC of a computing system, e.g., by NIC 130 of FIG. 1. In some embodiments, the NIC may automatically start to store AENs or EFs if such AENs or EFs cannot be sent off right away, e.g., when the NIC does not have the access to a shared medium in a shared topology. In some embodiments, the NIC may start to store AENs or EFs in response to receipt of an NC-SI command requesting the NIC to cease further sending of AENs or EFs. In some embodiments, the NIC may start to store AENs or EFs in response to receipt of an NC-SI command requesting the NIC to begin holding data.

In some embodiments, the NIC may further receive an NC-SI command requesting the NIC to provide holding information at the data module. As an example, the requested holding information may include a number of AENs or EFs being held in the data module. As another example, the requested holding information may include a number of AENs or EFs being dropped from the data module. Subsequently, the NIC may provide the data holding information to the requesting BMC.

Next, at block 320, an indication indicating an opportunity for the NIC to send AENs or EFs to a BMC may be received, e.g., by NIC 130 of FIG. 1. In some embodiments, the indication is merely that the NIC is being selected to access the shared medium, e.g., by a selector in a shared medium topology. In some embodiments, the indication is a command, e.g., NC-SI command, received from a bus in a shared topology between the NIC and at least another controller. In various embodiments, the bus may be one of a System Management Bus (SMB), an Inter-Integrated Circuit ($I^2C$) bus, a serial link, a Peripheral Component Interconnect Express (PCIe) bus, or a Universal Serial Bus (USB). The command may specify that the NIC may send off the previously held AENs or EFs. In some embodiments, the indication may be received based on MCTP.

Next, at block 330, the one or more of the stored AENs or EFs may be sent to the BMC in response to the indication, e.g., by NIC 130 of FIG. 1. In some embodiments, the NIC may be able to send off all AENs or EFs held in its buffer. In some embodiments, the NIC may only be able to send off a part of AENs or EFs held in its buffer, e.g., due to time constraint for its access to the shared medium or due to an interruption or superseding command from the BMC, e.g., request for the NIC to cease sending.

Resultantly, a NIC may still be able to send AENs or EFs in a shared medium topology, even though there may be no inherit medium dependent mechanism provided for shared access for the NIC.

Figure 4:
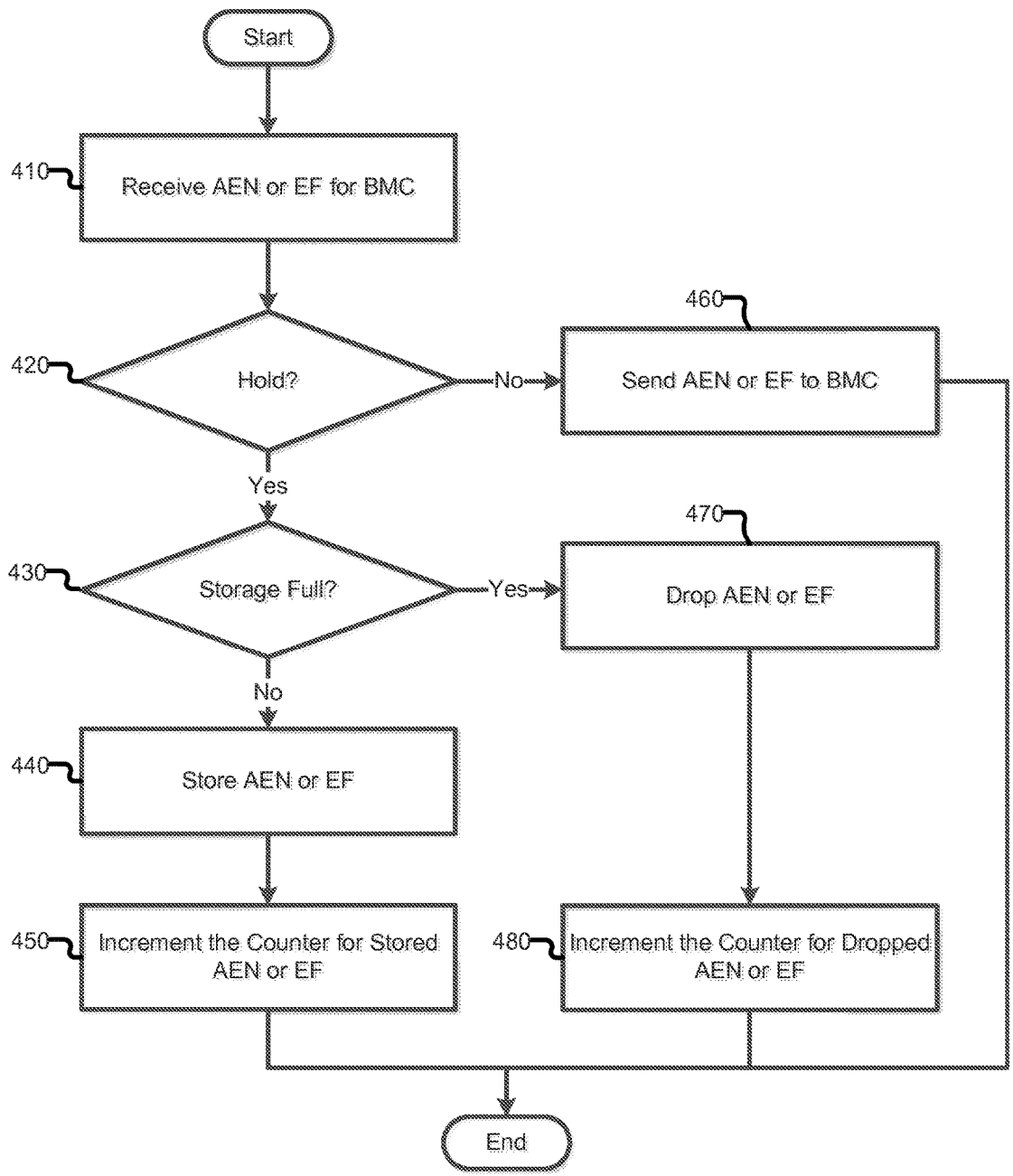
FIG. 4 is a flow diagram of another example process for storing AENs, which may be practiced by an example NIC, incorporating aspects of the present disclosure, in accordance with various embodiments.

Referring now to FIG. 4, it is a flow diagram of an example process for storing AENs, which may be practiced by an example NIC device, in accordance with various embodiments. The process 400 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured for storing NC-SI notifications or Ethernet frames by a NIC. As such, process 400 may be performed by, e.g., NIC 130 of FIG. 1, to implement one or more embodiments of the present disclosure. In various embodiments, process 400 may be performed in connection with block 310 of FIG. 3. In embodiments, process 400 may be performed with more or less operations or with the operations in different order.

In embodiments, the process may begin at block 410, where AENs or EFs directed to a BMC may be received, e.g., by an NIC. At block 420, a decision may be made, e.g., by the NIC, whether the NIC is in a status to hold the received AENs or EFs. As previously discussed in connection with block 310 of FIG. 3, the NIC may be in a status to hold the AENs or EFs if the NIC received a command from the BMC to hold such data or if the NIC simply does not have access to a shared medium. If the NIC is not in a status to hold the AENs or EFs, then the NIC may simply start to send off the AENs or EFs to the BMC at block 460.

However, if the NIC is in a status to hold the AENs or EFs, then the NIC may proceed with another inquiry of whether its storage, internal or external, is full at block 430. If its storage is full, then the NIC may drop the newly received AENs or EFs at block 470, consequently, increasing the counter for a dropped AEN or EF at block 480. On the other hand, if its storage is not full, then the NIC may start to store the newly received AENs or EFs at block 440. At block 440, the newly received AENs or EFs may be stored to the internal or external storage of the NIC. Next, the NIC may increase the counter for a stored AEN or EF at block 450.

Figure 5:
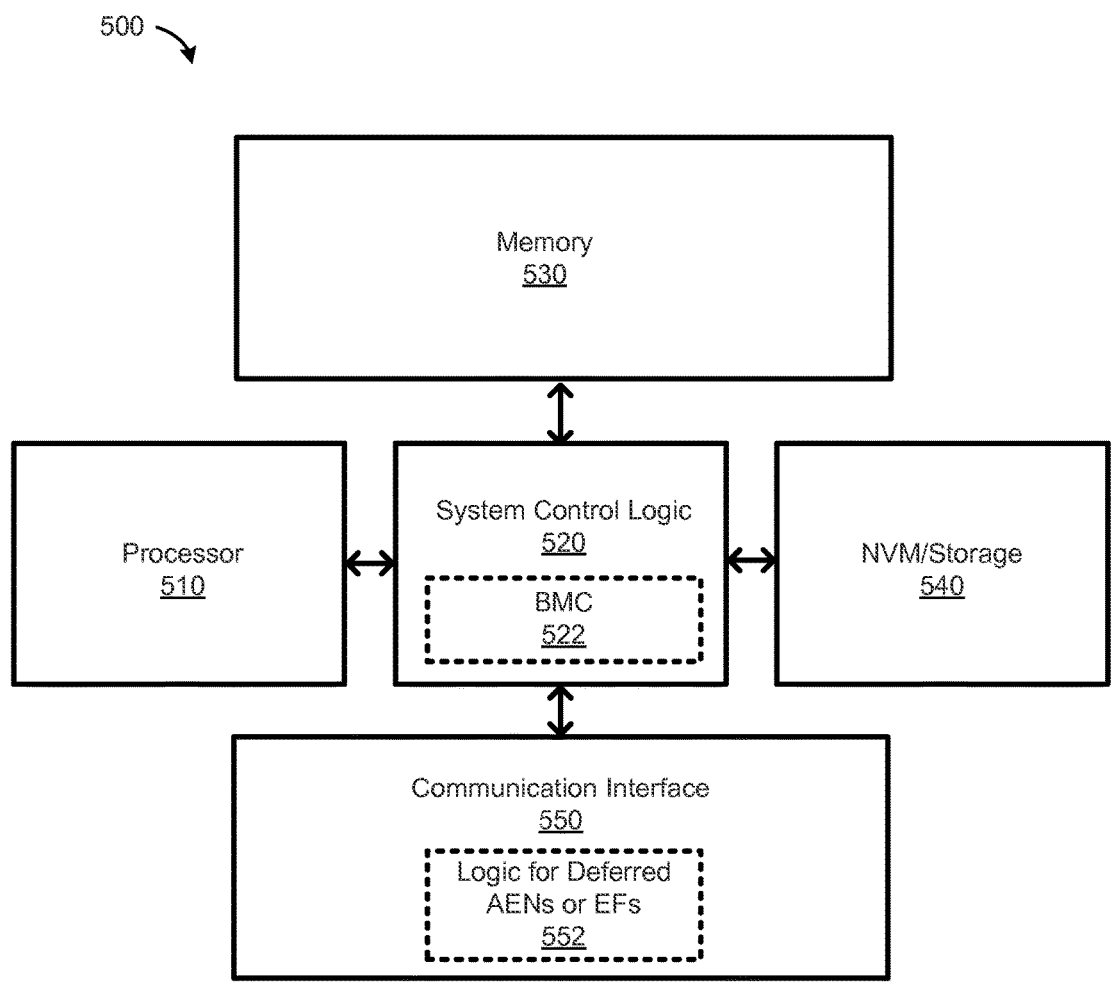
FIG. 5 illustrates an example computing device suitable for practicing the disclosed embodiments, in accordance with various embodiments.

FIG. 5 illustrates an embodiment of a computing device 500 suitable for practicing embodiments of the present disclosure. Computing device 500 may be any computing device that is within a user's reach (e.g., a device that the user carries, wears, touches, gestures, etc.), in forms such as a smartphone, a tablet, a laptop, a wearable device, a server, etc. As illustrated, computing device 500 may include system control logic 520 coupled to processor 510, to system memory 530, to non-volatile memory (NVM)/storage 540, and to communication interface 550. In various embodiments, processor 510 may include one or more processor cores.

In embodiments, communication interface 550 may provide an interface for computing device 500 to communicate with the variety of source devices, the variety of target devices, or the variety of systems/services in the cloud as previously discussed in connection with FIG. 1. In embodiments, communication interface 550 may provide an interface for computing device 500 to communicate over one or more network(s) and/or with any other suitable device. Communication interface 550 may include any suitable hardware and/or firmware, such as a network adapter, a network interface card, one or more antennas, wireless interface(s), and so forth.

In various embodiments, communication interface 550 may include multiple NICs for computing device 500, especially as a server, to use Ethernet technologies for LAN or WAN communication. NICs may manage coaxial, twisted pair, or fiber optic physical medium interfaces. A respective NIC may manage a respective Ethernet physical layer, such as 10BASE-T, 100BASE-TX, or 1000BASE-T.

In various embodiments, communication interface 550 may include an interface for computing device 500 to use radio-frequency identification (RFID), near field communication (NFC), optical communications, or other similar technologies to communicate directly (e.g., without an intermediary) with another device. In various embodiments, communication interface 550 may interoperate with radio communications technologies such as, for example, Wideband Code Division Multiple Access (WCDMA), Global System for Mobile Communications (GSM), Long Term Evolution (LTE), Bluetooth®, Zigbee, and the like.

In embodiments, communication interface 550 may include, in particular, logic for deferred AENs or EFs 552 to facilitate deferred NC-SI notifications, e.g., by a NIC. Logic for deferred AENs or EFs 552 may include instructions that, when executed by processor 510, result in computing device 500 to enable deferred NC-SI notifications, such as, but not limited to, processes 300 and 400. In embodiments, logic for deferred AENs or EFs 552 may include instructions that, when executed by processor 510, result in computing device 500 performing various functions associated with NIC 130 in connection with FIG. 1.

In some embodiments, system control logic 520 may include any suitable interface controllers to provide for any suitable interface to the processor 510 and/or to any suitable device or component in communication with system control logic 520. System control logic 520 may also interoperate with a display (not shown) for the display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 520 may include one or more memory controller(s) (not shown) to provide an interface to system memory 530. System memory 530 may be used to load and store data and/or instructions, for example, for computing device 500. System memory 530 may include any suitable volatile memory, such as dynamic random access memory (DRAM), for example.

In some embodiments, system control logic 520 may include one or more input/output (I/O) controller(s) (not shown) to provide an interface to NVM/storage 540 and communication interface 550. NVM/storage 540 may be used to store data and/or instructions, for example. NVM/storage 540 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 540 may include a storage resource that is physically part of a device on which computing device 500 is installed or it may be accessible by, but not necessarily a part of, computing device 500. For example, NVM/storage 540 may be accessed by computing device 500 over a network via communication interface 550.

In various embodiments, system control logic 520 may include BMC 522 to manage the interface between system management software and platform hardware. BMC 522 may also include logic for deferred AENs or EFs 552 to facilitate deferred NC-SI notifications. Logic for deferred AENs or EFs 552 may include instructions that, when executed by processor 510, result in computing device 500 to enable deferred NC-SI notifications, such as, but not limited to, process 200. In embodiments, logic for deferred AENs or EFs 552 may include instructions that, when executed by processor 510, result in computing device 500 performing various functions associated with BMC 110 in connection with FIG. 1.

In some embodiments, processor 510 may be packaged together with memory having system control logic 520 and/or logic for deferred AENs or EFs 552. In some embodiments, at least one of the processor(s) 510 may be packaged together with memory having system control logic 520 and/or logic for deferred AENs or EFs 552 to form a System in Package (SiP). In some embodiments, processor 510 may be integrated on the same die with memory having system control logic 520 and/or logic for deferred AENs or EFs 552. In some embodiments, processor 510 may be integrated on the same die with memory having system control logic 520 and/or logic for deferred AENs or EFs 552 to form a System on Chip (SoC).

Depending on which modules in connection with FIG. 1 are hosted by computing device 500, the capabilities and/or performance characteristics of processor 510, system memory 530, and so forth, may vary. In various implementations, computing device 500 may be a smartphone, a tablet, a mobile computing device, a wearable computing device, a server, etc., enhanced with the teachings of the present disclosure.

Figure 6:
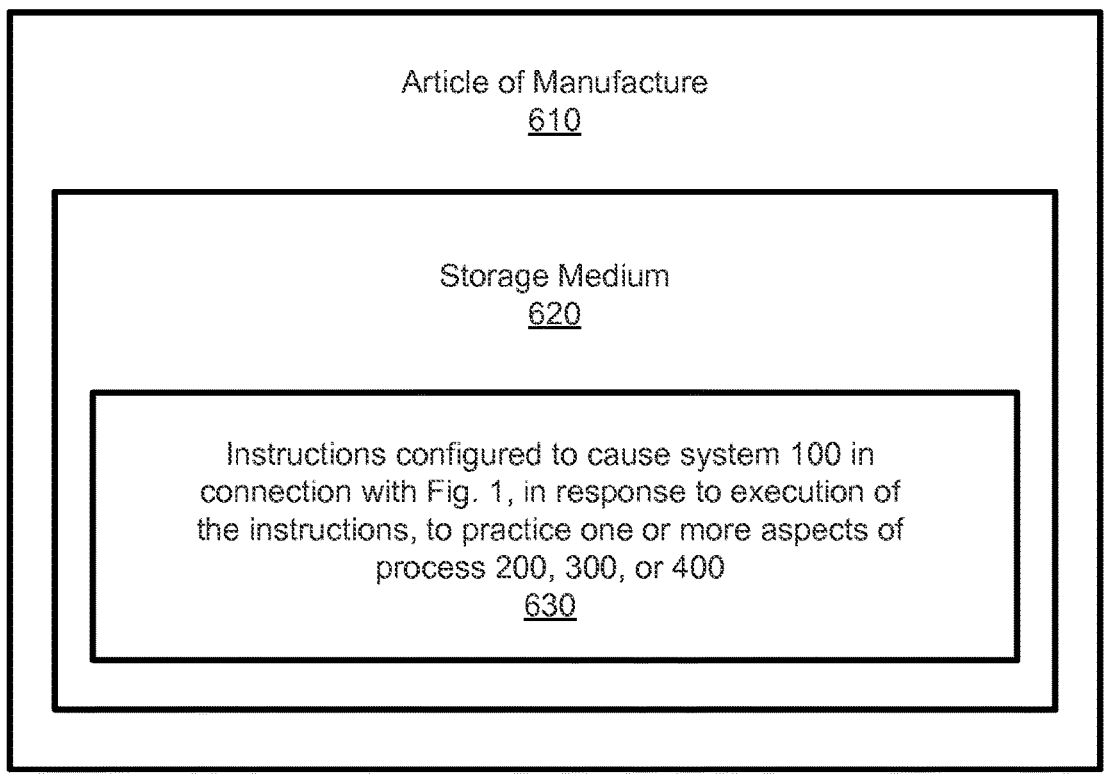
FIG. 6 illustrates an article of manufacture having programming instructions, incorporating aspects of the present disclosure, in accordance with various embodiments.

FIG. 6 illustrates an article of manufacture 610 having programming instructions, incorporating aspects of the present disclosure, in accordance with various embodiments. In various embodiments, an article of manufacture may be employed to implement various embodiments of the present disclosure. As shown, the article of manufacture 610 may include a computer-readable non-transitory storage medium 620 where instructions 630 are configured to practice embodiments of or aspects of embodiments of any one of the processes described herein. The storage medium 620 may represent a broad range of persistent storage media known in the art, including but not limited to flash memory, dynamic random access memory, static random access memory, an optical disk, a magnetic disk, etc. Instructions 630 may enable an apparatus, in response to their execution by the apparatus, to perform various operations described herein. As an example, storage medium 620 may include instructions 630 configured to cause an apparatus, e.g., BMC 110, to practice some aspects of deferring NC-SI notifications in a shared topology, as illustrated in process 200 of FIG. 2, in accordance with embodiments of the present disclosure. As another example, storage medium 620 may include instructions 630 configured to cause an apparatus, e.g., NIC 130, to practice some aspects of deferring NC-SI notifications in a shared topology, as illustrated in process 300 of FIG. 3 or process 400 of FIG. 4, in accordance with embodiments of the present disclosure. In embodiments, computer-readable storage medium 620 may include one or more computer-readable non-transitory storage media. In other embodiments, computer-readable storage medium 620 may be transitory, such as signals, encoded with instructions 630.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Example 1 is an apparatus for NC-SI notifications, which may include a data module to store one or more Asynchronous Events Notifications (AENs) or Ethernet frames (EFs); and a Network Interface Controller (NIC), coupled to the data module, to send the one or more AENs or Ethernet frames to a Baseboard Management Controller (BMC) in response to receipt of a command from the BMC indicating an opportunity for the NIC to send AENs or Ethernet frames to the BMC.

Example 2 may include the subject matter of Example 1, and may further specify that the NIC is to send the one or more stored AENs or EFs to the BMC, in response to receipt of the command of a first type of Network Controller Sideband Interface (NC-SI) command requesting the NIC to end holding data.

Example 3 may include the subject matter of Example 1 or 2, and may further specify that the NIC is to cease further sending of AENs or EFs, in response to receipt of another command of a second type of NC-SI command requesting the NIC to begin holding data.

Example 4 may include any subject matter of Examples 1-3, and may further specify that the NIC is to further receive another command of a third type of NC-SI command requesting the NIC to provide holding information at the data module.

Example 5 may include the subject matter of Example 4, and may further specify that the holding information comprises at least one of a number of AENs or EFs being held in the data module.

Example 6 may include the subject matter of Example 4 or 5, and may further specify that the holding information comprises at least one of a number of AENs or EFs being dropped from the data module.

Example 7 may include any subject matter of Examples 1-6, and may further specify that the NIC is coupled to a bus with a shared topology between the NIC and at least another controller, and the NIC is to receive the command over the bus.

Example 8 may include any subject matter of Examples 1-7, and may further specify that the NIC is coupled with and receives the command from at least one of a System Management Bus (SMB), an Inter-Integrated Circuit (I$^2$C) bus, a serial link, a Peripheral Component Interconnect Express (PCIe) bus, or a Universal Serial Bus (USB).

Example 9 may include any subject matter of Examples 1-8, and may further specify that the command is a Network Controller Sideband Interface (NC-SI) command, and the NIC is to receive the NC-SI command based on Management Component Transport Protocol (MCTP).

Example 10 may include any subject matter of Examples 1-9, and may further include the BMC, coupled to the NIC, to send the NIC the command indicating the opportunity for the NIC to send AENs or EFs.

Example 11 may include any subject matter of Examples 1-10, and may further include a System Management Bus (SMB) multiplexer, coupled to the NIC and the BMC, to facilitate a connection between the BMC and the NIC in response to a control signal from the BMC.

Example 12 is a method for deferring NC-SI notifications, which may include storing, by a Network Interface Controller (NIC) of a server computing system, one or more Asynchronous Events Notifications (AENs) or Ethernet frames (EFs); receiving, by the NIC, an indication indicating an opportunity for the NIC to send AENs or EFs to a Baseboard Management Controller (BMC) of the server computing system; and sending, by the NIC, one or more of the stored AENs or EFs to the BMC in response to the command.

Example 13 may include the subject matter of Example 12, and may further specify that the indication is a first command of a first type of Network Controller Sideband Interface (NC-SI) command requesting the NIC to end holding data. Example 13 may further include receiving, by the NIC, a second command of a second type of NC-SI command requesting the NIC to begin holding data; and storing, by the NIC, a plurality of AENs or EFs in response to the second type of NC-SI command.

Example 14 may include the subject matter of Example 12 or 13, and may further specify that the indication is a first command of a first type of Network Controller Sideband Interface (NC-SI) command requesting the NIC to end holding data. Example 14 may further include receiving, by the NIC, a second command of a second type of NC-SI command requesting the NIC to provide data holding information, wherein the data holding information comprises at least one of a number of AENs or EFs being held in a data storage, or at least one of a number of AENs or EFs being dropped from the data module; and providing, by the NIC, the data holding information to the BMC.

Example 15 may include any subject matter of Examples 12-14, and may further specify that the receiving comprises receiving the indication from a bus in a shared topology between the NIC and at least another controller.

Example 16 may include any subject matter of Examples 12-15, and may further specify that the receiving comprises receiving the indication from at least one of a System Management Bus (SMB), an Inter-Integrated Circuit (I²C) bus, a serial link, a Peripheral Component Interconnect Express (PCIe) bus, or a Universal Serial Bus (USB).

Example 17 may include any subject matter of Examples 12-16, and may further specify that the receiving comprises receiving a Network Controller Sideband Interface (NC-SI) command based on a Management Component Transport Protocol (MCTP).

Example 18 is a method for deferring NC-SI notifications, which may include directing, by a Baseboard Management Controller (BMC), a selector to communicate with a Network Interface Controller (NIC); sending, by the BMC, a command indicating an opportunity for the NIC to send Asynchronous Events Notifications (AENs) or Ethernet frames (EFs) to the BMC; and receiving, by the BMC, one or more AENs or EFs from the NIC through the selector.

Example 19 may include the subject matter of Example 18, and may further specify that the command is a first command of a first type of Network Controller Sideband Interface (NC-SI) command requesting the NIC to end holding data. Example 19 may further include sending, by the BMC, to the NIC a second command of a second type of NC-SI command requesting the NIC to begin holding data.

Example 20 may include the subject matter of Example 18 or 19, and may further specify that the command is a first command of a first type of Network Controller Sideband Interface (NC-SI) command requesting the NIC to end holding data. Example 20 may further include sending, by the BMC, to the NIC a second command of a second type of NC-SI command requesting the NIC to provide data holding information, wherein the data holding information comprises at least one of a number of AENs or EFs being held in a data storage, or at least one of a number of AENs or EFs being dropped from the data module.

Example 21 may include any subject matter of Examples 18-20, and may further specify that the sending comprises sending the command over a bus with a shared topology between the NIC and at least another controller.

Example 22 may include any subject matter of Examples 18-21, and may further specify that the sending comprises sending the command based on a Management Component Transport Protocol (MCTP).

Example 23 may include any subject matter of Examples 18-22, and may further specify that the receiving comprises receiving the one or more AENs or EFs from the NIC through a round-robin mechanism enabled on the selector.

Example 24 may include any subject matter of Examples 18-23, and may further specify that the selector is a System Management Bus (SMB) multiplexer.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus for computing, comprising:
a data module, including a computer-readable non-transitory storage medium, to store one or more Asynchronous Events Notifications (AENs) or Ethernet frames (EFs);
a processor coupled to the data module; and
a Network Interface Controller (NIC) to include the data module and the processor, wherein the NIC is one of a plurality of NICs coupled to a controller, wherein each of the plurality of NICs includes a corresponding each of a plurality of data modules for storing one or more AENs or EFs, wherein after deferral of transfer of the one or more AENs or EFs to the controller, the processor is to cause the NIC to send the one or more AENs or EFs stored in the data module to the controller in response to receipt of a command from the controller indicating an opportunity for the NIC to send AENs or EFs to the controller.

2. The apparatus according to claim 1, wherein the NIC is to send the one or more stored AENs or EFs to the controller, in response to receipt of a Network Controller Sideband Interface (NC-SI) command requesting the NIC to end holding data.

3. The apparatus according to claim 2, wherein the NIC is to cease further sending of AENs or EFs, in response to receipt of another NC-SI command requesting the NIC to begin holding data.

4. The apparatus according to claim 2, wherein the NIC is to further receive another NC-SI command requesting the NIC to provide holding information at the data module.

5. The apparatus according to claim 4, wherein the holding information comprises at least one of a number of AENs or EFs being held in the data module.

6. The apparatus according to claim 4, wherein the holding information comprises at least one of a number of AENs or EFs being dropped from the data module.

7. The apparatus according to claim 1, wherein the NIC is coupled to a bus with a shared topology between the NIC and at least another NIC in the plurality of NICs, and the NIC is to receive the command over the bus.

8. The apparatus according to claim 1, wherein the NIC is coupled with and receives the command from at least one of a System Management Bus (SMB), an Inter-Integrated Circuit (I²C) bus, a serial link, a Peripheral Component Interconnect Express (PCIe) bus, or a Universal Serial Bus (USB).

9. The apparatus according to claim 1, wherein the command is a Network Controller Sideband Interface (NC-SI) command, and the NIC is to receive the NC-SI command based on Management Component Transport Protocol (MCTP).

10. The apparatus according to claim 1, further comprising:
the controller, coupled to the NIC, to send the NIC the command indicating the opportunity for the NIC to send AENs or EFs.

11. The apparatus according to claim 1, further comprising:
a System Management Bus (SMB) multiplexer, coupled to the NIC and the controller, to facilitate a connection between the controller and the NIC in response to a control signal from the controller, wherein the controller is a Baseboard Management Controller (BMC).

12. A method, comprising:
storing, by a Network Interface Controller (NIC) of a server computing system, one or more Asynchronous Events Notifications (AENs) or Ethernet frames (EFs) for deferred transfer to a controller of the server computer system;
receiving, by the NIC, an indication indicating an opportunity for the NIC to send AENs or EFs to Hall the controller;
and
sending, by the NIC, one or more of the stored AENs or EFs to the controller in response to the indication, wherein the NIC is one of a plurality of NICs coupled to the controller, wherein each of the NICs in the plurality has a corresponding each of a plurality of data modules to hold the AENs or EFs for the deferred transfer to the controller.

13. The method of claim 12, wherein the indication is a first Network Controller Sideband Interface (NC-SI) command requesting the NIC to end holding data, the method further comprising:
receiving, by the NIC, a second NC-SI command requesting the NIC to begin holding data; and
storing, by the NIC, a plurality of AENs or EFs in response to the second NC-SI command.

14. The method of claim 12, wherein the indication is a first Network Controller Sideband Interface (NC-SI) command requesting the NIC to end holding data, the method further comprising:
receiving, by the NIC, a second NC-SI command requesting the NIC to provide data holding information, wherein the data holding information comprises at least one of a number of AENs or EFs being held in a data storage, or at least one of a number of AENs or EFs being dropped from the data module; and
providing, by the NIC, the data holding information to the controller.

15. The method of claim 12, wherein the receiving comprises receiving the indication from a bus in a shared topology between the NIC and at least another controller.

16. The method of claim 12, wherein the receiving comprises receiving the indication from at least one of a System Management Bus (SMB), an Inter-Integrated Circuit (PC) bus, a serial link, a Peripheral Component Interconnect Express (PCIe) bus, or a Universal Serial Bus (USB).

17. The method of claim 12, wherein the receiving comprises receiving a Network Controller Sideband Interface (NC-SI) command based on a Management Component Transport Protocol (MCTP).

18. A method, comprising:
directing, by a controller, a selector to communicate with a Network Interface Controller (NIC), wherein the NIC is one of a plurality of NICs, coupled to the controller, and each of the NICs having a corresponding each of a plurality of data modules to hold Asynchronous Events Notifications (AENs) or Ethernet frames (EFs) for deferred transfer of the AENs or EFs to the controller;
sending, by the controller, a command indicating an opportunity for the NIC to cease deferral of transfer of the AENs or EFs by sending the AENs or EFs to the controller; and
receiving, by the controller, the AENs or EFs from the NIC through the selector.

19. The method of claim 18, wherein the command is a first Network Controller Sideband Interface (NC-SI) command requesting the NIC to end holding data, the method further comprising:
sending, by the controller, to the NIC a second command of a second NC-SI command requesting the NIC to begin holding data.

20. The method of claim 18, wherein the command is a first NC-SI command requesting the NIC to end holding data, the method further comprising:
sending, by the controller, to the NIC a second NC-SI command requesting the NIC to provide data holding information, wherein the data holding information comprises at least one of a number of AENs or EFs being held in a data storage, or at least one of a number of AENs or EFs being dropped from the data module.

21. The method of claim 18, wherein the sending comprises sending the command over a bus with a shared topology between the NIC and at least another NIC in the plurality of NICs.

22. The method of claim 18, wherein the sending comprises sending the command based on a Management Component Transport Protocol (MCTP).

23. The method of claim 18, wherein the receiving comprises receiving the one or more AENs or EFs from the NIC through a round-robin mechanism enabled on the selector.

24. The method of claim 18, wherein the selector is a System Management Bus (SMB) multiplexer.

* * * * *

UNITED STATES PATENT AND TRADEMARK OFFICE
CERTIFICATE OF CORRECTION

PATENT NO. : 10,057,330 B2  
APPLICATION NO. : 14/532872  
DATED : August 21, 2018  
INVENTOR(S) : Patrick G. Kutch Page 1 of 1

It is certified that error appears in the above-identified patent and that said Letters Patent is hereby corrected as shown below:

In the Claims

Column 13 Line 21, "...to Hall the..." should read – "...to the..."

Signed and Sealed this
Nineteenth Day of February, 2019

Andrei Iancu
*Director of the United States Patent and Trademark Office*